United States Patent [19]
Miller et al.

[11] 3,872,881
[45] Mar. 25, 1975

[54] TETHER BAND FOR FLEXIBLE HYDRAULIC HOSES

[75] Inventors: Lawrence J. Miller; Roger M. Smith, both of Joliet, Ill.

[73] Assignee: Caterpillar Tractor Co., Peoria, Ill.

[22] Filed: Nov. 26, 1973

[21] Appl. No.: 419,114

Related U.S. Application Data

[60] Division of Ser. No. 379,587, July 16, 1973, , which is a continuation of Ser. No. 223,466, Feb. 4, 1972, abandoned.

[52] U.S. Cl.......... 137/355.17, 191/12 R, 280/421, 285/114, 248/51, 248/54
[51] Int. Cl............................................. B65h 75/36
[58] Field of Search ......... 280/421; 191/12 C, 12 P, 191/12, 12.2 C, 12.4, 12 R; 137/355.17, 344, 355.16, 65; 285/114, 137 R; 248/51, 54, 64

[56] References Cited
UNITED STATES PATENTS

| | | | |
|---|---|---|---|
| 2,668,557 | 2/1954 | Hoelscher | 285/114 |
| 2,748,803 | 6/1956 | Guarnashelli | 285/114 |
| 2,865,979 | 12/1958 | Klassen | 191/12 R UX |
| 3,546,400 | 12/1970 | Dechansreiter | 137/355.17 X |
| 3,722,916 | 3/1973 | Muntjanoff | 280/421 |

*Primary Examiner*—Henry T. Klinksiek
*Attorney, Agent, or Firm*—Phillips, Moore, Weissenberger, Lempio & Strabala

[57] ABSTRACT

A tether band for flexible conduits, such as hydraulic hoses, which provide fluid communication between machine parts having relative movement, includes a wide metal band having an anchor unit on at least one end thereof for securing it to a rigid fitting on one end of a conduit and a plurality of brackets disposed in spaced relationship along the band for interconnecting the band with a flexible conduit arranged in a corresponding arcuate relationship with the band to restrict the undesirable lateral movements of the flexible conduit parallel to the width of the band without interference of common movements normal thereto.

5 Claims, 8 Drawing Figures

3,872,881

TETHER BAND FOR FLEXIBLE HYDRAULIC HOSES

This is a division of Ser. No. 379,587, filed July 16, 1973 which, in turn, is a continuation of Ser. No. 223,466, filed Feb. 4, 1972, the latter now abandoned.

BACKGROUND OF THE INVENTION

Flexible conduits such as reinforced hydraulic hoses, are often used to provide fluid communication between parts of machinery which move relative to each other. Where the relative movement is substantial the hoses often employ large loops or coils to accommodate the movement between the several parts of such machinery. If such conduits are highly flexible, as in some types of high pressure reinforced hose, it is necessary to control the loops or coils of these conduits where they are in close proximity to the moving parts of the machinery to prevent them from fouling in such parts and being damaged by abrasive conditions or from stresses produced by twisting and tangling.

Various devices such as shown in U.S. Pat. No. 2,175,662, issued to Elmhurst, U.S. Pat. No. 1,371,981, issued to Rose, and U.S. Pat. No. 2,665,557, issued to Hoelsher are typical of those employing metal bands to control flexible conduits or portions thereof in machine tools to prevent such conduits from being damaged.

This invention is directed to a tether for relatively large flexible hydraulic hoses and in particular those used for connecting parts of earthmoving machinery which are articulated relative to one another. In particular the current invention is directed toward controlling large flexible conduits providing fluid communication between the articulated tractor and scraper portions of earthmoving scrapers. Because of the large sizes of such hydraulic hoses and their flexible character, their loops between the tractor and scraper are subjected to a large number of induced dynamic forces during machine operation which can result in damage to their structural integrity, especially in the area of their connection to the hose coupling where sharp bending can lead to hose failure. Further, problems are caused by the hose fouling in adjacent moving parts, damage to the hose integrity from banging against machine parts and also abrasion problems resulting from rubbing movements and others.

When attempting to tether large sized reinforced hydraulic hoses and additional problem results from the fact that such hoses grow and contract both radially and axially as they respond to internal pressure changes and thus any support system must not grip such hoses in a manner to cause stress in the hose structure when tethering such hoses against unwanted movement.

Therefore, it is an object of this invention to provide an improved tether band for large size hydraulic hoses utilized in earthmoving machinery without experiencing the problems.

Another object of the instant invention is the provision of a support that coordinates with the hydraulic hose and its hose fitting so that it forms an integral unit which can be removed as a unit from machines on which the hoses and support are employed.

SUMMARY OF THE INVENTION

An improved tether for flexible hydraulic hoses having couplings or fittings at its opposite ends, can accomplish the above objects as well as other, by utilizing an elongated metal band having an another unit on at least one end for attaching it to a hose fitting or coupling with a plurality of spaced notches or slots along the length of the band cooperating with brackets to connect the hose or hoses to the band in a manner that the hose can move axially relative thereto and grow and contract radially without injury. In one embodiment an elastomer insert with apertures for receiving the hose or hoses therethrough can be utilized within the straps to allow limited freedom of movement between the band and hoses because of the resilience of the insert. Also such an insert can accommodate radial growth and contraction of the hoses as well. In a more preferred embodiment the band includes an anchoring unit at both ends thereof and brackets which will allow relative movement between the hose or hoses and the metal band to accommodate differences in arcuate lengths thereof and also the movement of the hydraulic hoses resulting from pressure induced radial changes.

DESCRIPTION OF A PREFERRED EMBODIMENT

Figure 1:
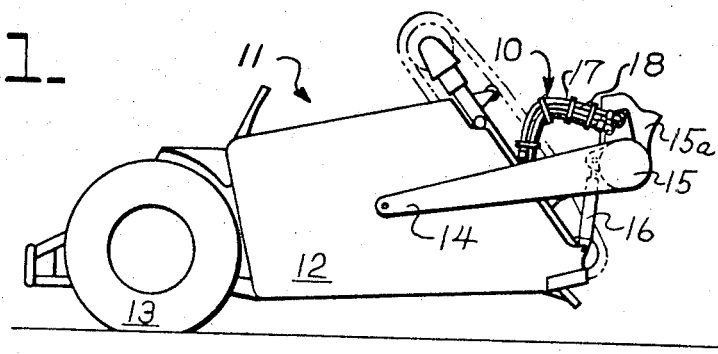
FIG. 1 is an elevation of a rear portion of an elevating earthmoving scraper with high pressure hydraulic hoses extending between its spreader tube and its bowl, which utilize the improved tether band.

In earthmoving machinery having articulated components connected by hydraulic hoses, it has often been a practice to support such hoses from brackets which often are cantilevered from the vehicle such as shown in U.S. Pat. No. 2,519,888 issued to Young et al. By contrast, this invention supports with tether band 10 which is integrally associated with the hydraulic hoses and functions as a unit therewith, as for example, in an elevating earthmoving scraper 11 as shown in FIG. 1. Its bowl 12 is supported on rear wheels 13 and pivoted on the bowl are draft arms 14 which extend to the spreader tube 15 and together with jacks 16, support the forward end of the bowl through the gooseneck 15a connecting this structure with the tractor portion of the scraper (not shown).

Mounted in the forward opening of the bowl 12 is a hydraulically powered elevating mechanism which is powered through two large reinforced hydraulic hoses 17 and 18, which extend between the spreader tube and the bowl to connect respective circuits thereon so that fluid pressure may be transmitted between the tractor and the scraper for operating the earth elevating mechanisms.

Because scraper bowl 12 moves vertically with reference to the spreader tube 15, hoses 17 and 18 are used to provide a flexible connection between the fluid circuits on these respective components and are disposed in arcuate loops between hose fittings on opposite ends of the hose, through which these hoses are connected to the machine parts with bolts 20. The loops are selected to allow the desired vertical movements between these components with larger loops being required for greater relative vertical movement.

Figure 3:
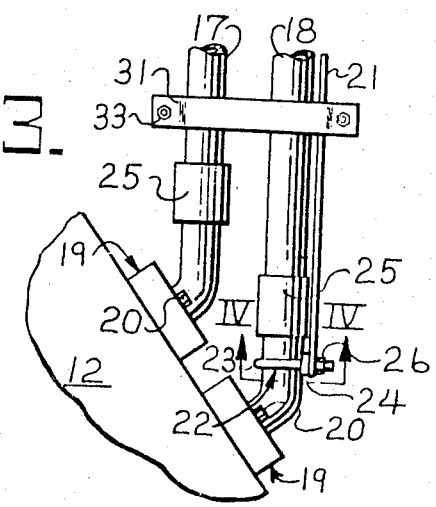
FIG. 3 is a broken-away elevation showing the anchor fittings at the end of the tether band that connect to the hose fittings, amplifying the illustrations in FIGS. 1 and 2.
Figure 4:
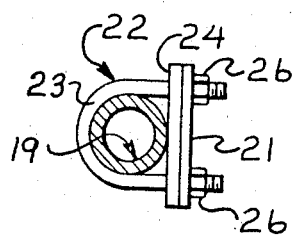
FIG. 4 is a cross section of the hydraulic hoses along lines IV—IV of FIG. 3.

In the preferred embodiment of the tether band 10, both ends of the wide metal band 21 forming the main flexible support member, include an anchor unit 22 which is formed, as best shown in FIGS. 3 and 4, by a U-bolt 23 and a spacer 24 with the U-bolt adapted to encircle the tubular portion of the hose fitting 19. The spacer holds the metal band 21 off the surface of the tubular portion of the fitting so the band can be positioned parallel to the cylindrical outer surface of the collar 25 of the fitting when the ends of the U-bolt are passed through holes in the spacer and band, being secured with nuts 26 tightened against the outer surface of the band.

With both ends of the metal band anchored to the fittings at opposite ends of the hose, the band is preferably located inside the arc of the innermost hose or hoses which it tethers. This arrangement allows the band to circumscribe an arc slightly smaller than the innermost hose whereby abrasive contact between the metal band and the hose will be minimized.

Figure 5:
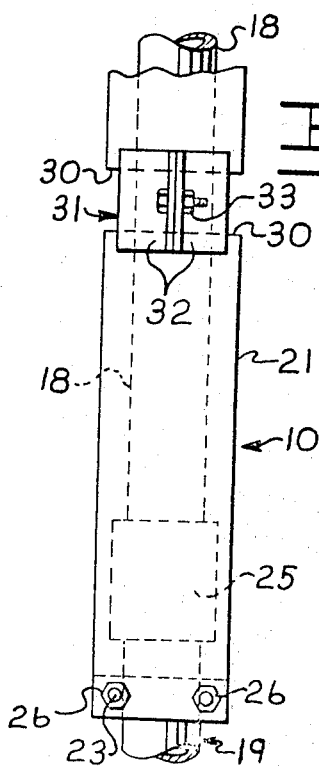
FIG. 5 is a bottom plan view of one end of the metal band and hose structure with parts broken away.

The metal band includes a plurality of spaced notches 30 along its length, one for each bracket 31, as illustrated best in FIG. 5. These notches alternately could be formed by a pair of spaced slots in the band, rather than the notches shown. In the embodiment shown, notches 30 are located closely adjacent to each end of the metal band 21 so a bracket 31 can commonly engage the band and the adjacent hose or hoses near their connections to an associated hose fitting, as illustrated in FIG. 2.

Locating the brackets close to the connections between the hoses and fittings prevents the band from pivoting on its anchor unit 22 connection to the hose fitting 19 thereby limiting movement of the band in a plane parallel to its width. This arrangement also prevents sharp bends from occurring in the hose in the areas immediately adjacent to its connection to its fittings, which is an area of common failure on untethered hoses of this type.

Figure 2:
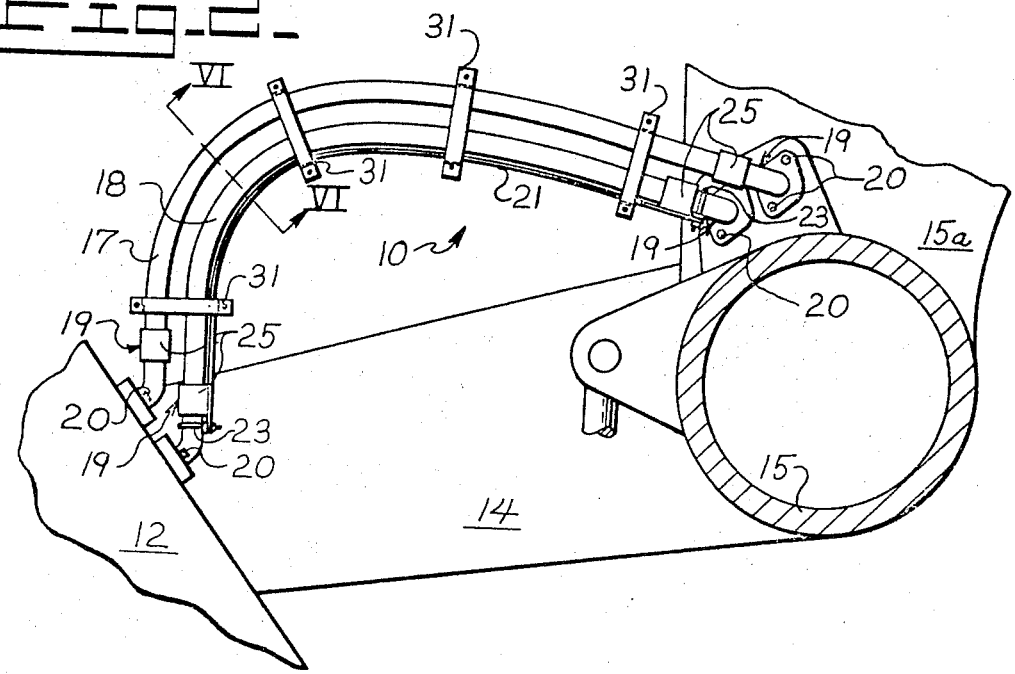
FIG. 2 is a broken-away enlarged elevation of the hydraulic hoses and cooperating improved tether band, shown in FIG. 1.

Between the notches 30, which alternately could be slots as indicated above, adjacent to the respective ends of the metal bands, are a plurality of additional spaced notches which also receive brackets 31, as illustrated in FIG. 2, to commonly connect the band and the hose or hoses in areas intermediate of the ends of the band.

Figure 6:
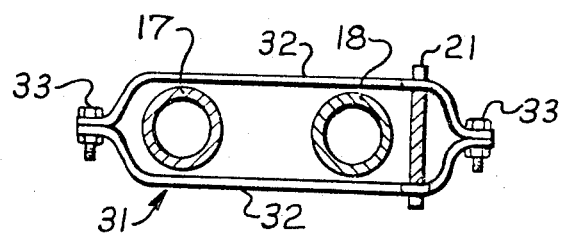
FIG. 6 is a cross section along lines VI—VI of FIG. 2.
Figure 7:
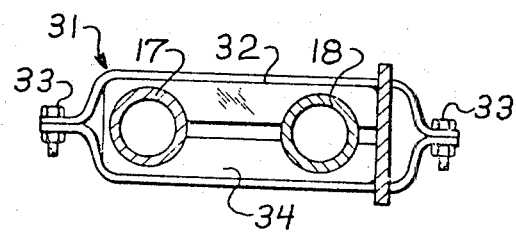
FIG. 7 illustrates the same cross section shown in FIG. 6 with an elastomer insert for positioning the hose members within the bracket.

In the drawings brackets 31 are sized to accommodate two hoses and therefore are elongated for this purpose, as best shown in FIGS. 6 and 7. If only a single hose is to be tethered with the tether band the brackets 31 are sized appropriately. These brackets 31, are formed from two identical U-shaped rigid steps 32 which are joined together at their opposite ends with bolts 33 to form a hose cage, after the straps have been assembled over the hose or hoses and in notches 30 as illustrated. In one embodiment of these brackets, best shown in FIG. 5, the rigid straps include small notches in their opposite side edges and the width of the brackets themself are somewhat wider than notches 30 in the band so that when the straps are assembled with the band the respective notches interfit with one another and prevent rotation of the bracket on the band at its connection therewith. As a result, loadings tending to displace the hose or hoses in a horizontal direction between its fitting connections in the illustrated embodiment are partially absorbed by torquing or twisting the band thereby providing a resilient shock dampening feature.

In FIG. 6 the hoses are merely positioned loosely within the cage formed by confines of the brackets 31 so that they can grow radially and move axially relative to the brackets and band without restraint. However, they are restricted by the resulting cages from large deviations. As a result of this arrangement the hoses are free to move due to pressure changes and also during relative vertical adjustments between the bowl and the spreader tube, without causing any shear or stress on the hoses themselves. Further the intermediate brackets 31 tend to stabilize the hose along its entire length by coupling it to the band thereby preventing any dynamic loads from inducing large horizontal movements.

Figure 8:
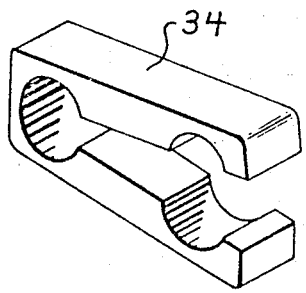
FIG. 8 is a perspective of the elastomer insert, shown in elevation in FIG. 7.

In some environments and in some applications it may be desirable to eliminate any abrasion between the surfaces of the hoses 17 and 18 which is caused by rubbing against the cages formed by brackets 31. To accomplish this an elastomer insert 34 may be employed to position the hoses within the brackets without interference with their radial growth or limited axial movement occurring during pressure changes within the several hoses or because of vertical movement between the respective machine parts during adjustment thereof. An elastomer insert 34 is shown in FIGS. 7 and 8, and is typical of those which can be employed within the confines of a bracket to limit these abrasion problems. When using the elastomer insert arrangements, it is possible to replace the brackets 31 with the thinner metal straps which secure the insert tightly against the metal band 21 provided the insert has sufficient structural integrity to prevent its collapse, when it is fastened in this manner to the band.

With the above described tether bands it is possible to preassemble the tether with the hoses prior to mounting them on the machine since the tether connects only to the hose fittings rather than the machine parts which greatly simplifies assembly problems and allows these assemblies to be handled as units rather than independent parts which are fabricated on the machine. Also it requires no modification when these tether bands are installed in older scrapers in current service since no modification or attachment to the component parts of the machine are required. Since the band is relatively lightweight the fittings are not overstressed by the tether and the system is able to limit the movement of the hoses so that large inertia forces cannot build up. As a result a very serviceable arrangement is obtained at a reasonable cost.

The metal band 21 is attached, as shown in the drawings, with its width axis oriented parallel to a horizontal plane (plane of undesired hose movement) and its thickness axis parallel to a vertical plane which allows it to roll or bend along its length as the components of the machine more vertical to one another, without any substantial resistance.

However, the band is substantially inflexible to bending it along its length in a plane which is normal to both its longitudinal axis and its thickness axis thereby preventing any substantial movement in such a plane of a hose or hoses tethered to the band and yet allowing complete freedom for vertical adjustment between its respective ends.

As best seen in FIGS. 4, 6 and 7, the metal band 21 is generally rectangular and has a thickness T of approximately 0.050 of an inch with the width W selected to achieve the necessary structural support for the hoses involved.

What is claimed is:

1. A tether band for restraining flexible hydraulic hoses having hose fittings attached to their opposite ends for connecting them to machine components having relative movement comprising:

an elongated metal band having a width substantially greater than its thickness, said metal band having a plurality of spaced notches along its length and flexible along its longitudinal axis normal to its width;

an anchor means on at lest one end of said metal band for attaching it to a hose fitting of one of such hoses so said band is attached to one of the components through a hose fitting so it can be removed with such hoses as a unit without being disconnected from such fitting; and a plurality of bracket means disposed in spaced relationship along the length of said band in spaced notches operable to prevent longitudinal movement of said bracket means along said band with at least one of said bracket means located adjacent to each end of said band and any remaining bracket means disposed intermediately thereof, each of said bracket means including means attaching it in its notch which prevents rotation of said bracket about the longitudinal axis of said band.

2. The tether band as defined in claim 1 wherein the anchor means includes a U-bolt and a spacer whereby the metal band can be attached to a circular portion of a hose fitting and so its longitudinal axis is parallel to the cylindrical surfaces of said hose fitting to which it is attached.

3. The tether band as defined in claim 1 wherein each bracket means includes an elastomer insert with apertures to accept hydraulic hoses to be retained thereby.

4. The tether band as defined in claim 1 wherein both ends of the metal band include an anchor means for respectively attaching its ends to hose fittings at opposite ends of a hose tethered thereby.

5. The tether band as defined in claim 1 wherein the bracket means are formed of a pair of rigid straps that form a cage around a hose when attached to the metal band to allow limited movement of said hose within said bracket means thereby allowing radial growth and limited axial movement of said hose within the bracket means as a result of pressure changes within the hose and relative movement caused by vertical adjustment of machine components between which said hose is attached.

* * * * *